United States Patent
Kerner

(10) Patent No.: US 9,651,297 B2
(45) Date of Patent: *May 16, 2017

(54) POWER SUPPLIES FOR LIGHTED SHELVES IN A REFRIGERATOR

(71) Applicant: WHIRLPOOL CORPORATION, Benton Harbor, MI (US)

(72) Inventor: James Kerner, Indianapolis, IN (US)

(73) Assignee: Whirlpool Corporation, Benton Harbor, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/239,194

(22) Filed: Aug. 17, 2016

(65) Prior Publication Data

US 2016/0356544 A1 Dec. 8, 2016

Related U.S. Application Data

(63) Continuation of application No. 14/880,604, filed on Oct. 12, 2015, which is a continuation of application
(Continued)

(51) Int. Cl.
*A47B 96/04* (2006.01)
*F25D 27/00* (2006.01)
(Continued)

(52) U.S. Cl.
CPC ............ *F25D 27/00* (2013.01); *F21V 23/001* (2013.01); *F21V 23/06* (2013.01);
(Continued)

(58) Field of Classification Search
CPC ................................ F25D 25/02; F25D 25/062
(Continued)

(56) References Cited

U.S. PATENT DOCUMENTS 2,704,838 A 3/1955 Macha et al.
3,044,035 A 7/1962 Adams, Jr.
(Continued)

FOREIGN PATENT DOCUMENTS

DE 2012008355 U1 10/2012
KR 20080022440 A 3/2008
(Continued)

OTHER PUBLICATIONS

European Patent Office, "Extended European Search Report," issued in connection with EP Application No. 14153102.0-1605, mailed Nov. 19, 2015, 12 pages.

*Primary Examiner* — Matthew Ing
(74) *Attorney, Agent, or Firm* — Nyemaster Goode, P.C.

(57) ABSTRACT

Illustrative embodiments of systems and methods for powering lighted shelves in refrigerator appliances are described. In one embodiment, a refrigerator appliance may comprise a cabinet having a temperature-controlled compartment defined therein, a shelf ladder disposed at least partially in the temperature-controlled compartment and providing a plurality of shelf mounting positions, the shelf ladder comprising an electrical bus including first, second, and third conductors, the second conductor configured to supply power at a first current level when electrically coupled to the first conductor, the third conductor configured to supply power at a second current level when electrically coupled to the first conductor, and a first adjustable shelf carrying a first lighting device, the first adjustable shelf being removably mountable in one of the plurality of shelf mounting positions such that the first lighting device is electrically coupled between the first conductor and the second conductor.

11 Claims, 7 Drawing Sheets

Related U.S. Application Data

No. 13/761,784, filed on Feb. 7, 2013, now Pat. No. 9,157,678.

(51) Int. Cl.

| | | |
|---|---|---|
| *F25D 25/02* | (2006.01) | |
| *F21V 23/00* | (2015.01) | |
| *F21V 33/00* | (2006.01) | |
| *F25D 23/00* | (2006.01) | |
| *F25D 29/00* | (2006.01) | |
| *H02G 3/08* | (2006.01) | |
| *F21V 23/06* | (2006.01) | |
| *F25D 11/02* | (2006.01) | |
| *F21W 131/305* | (2006.01) | |

(52) U.S. Cl.
CPC .......... *F21V 33/0044* (2013.01); *F25D 11/02* (2013.01); *F25D 23/00* (2013.01); *F25D 25/02* (2013.01); *F25D 25/024* (2013.01); *F25D 27/005* (2013.01); *F25D 29/005* (2013.01); *H02G 3/08* (2013.01); *F21W 2131/305* (2013.01); *F25D 2325/021* (2013.01); *F25D 2400/40* (2013.01)

(58) Field of Classification Search
USPC .............................. 312/401, 406; 362/92, 94
See application file for complete search history.

(56) References Cited

U.S. PATENT DOCUMENTS

| | | |
|---|---|---|
| 3,181,102 A | 4/1965 | Fehr, Jr. |
| 3,231,732 A | 1/1966 | Erguson, Jr. |
| 3,506,325 A | 4/1970 | Horvay |
| 3,814,492 A | 6/1974 | Jacobs |
| 4,029,378 A | 6/1977 | Bolis |
| 4,637,677 A | 1/1987 | Barkus |
| 4,657,333 A | 4/1987 | Anderson |
| 4,689,726 A | 8/1987 | Kretzschmar |
| 4,974,121 A | 11/1990 | Masuko et al. |
| 5,034,861 A | 7/1991 | Sklenak et al. |
| 5,259,774 A | 11/1993 | Gabrius |
| 5,287,252 A | 2/1994 | Caruso |
| 5,348,485 A | 9/1994 | Briechle et al. |
| 5,403,083 A | 4/1995 | Dasher et al. |
| 5,425,648 A | 6/1995 | Farham |
| 5,550,361 A | 8/1996 | Huis et al. |
| 5,600,310 A | 2/1997 | Whipple, III et al. |
| 5,685,748 A | 11/1997 | Harting et al. |
| 5,690,415 A | 11/1997 | Krehl |
| 6,042,244 A | 3/2000 | Witkoski |
| 6,120,304 A | 9/2000 | Harwood et al. |
| 6,200,146 B1 | 3/2001 | Sarkissian |
| 6,231,205 B1 | 5/2001 | Slesinger et al. |
| 6,786,562 B2 | 9/2004 | Obrock et al. |
| 6,813,896 B1 | 11/2004 | Janke et al. |
| 7,107,779 B2 | 9/2006 | Avenwedde et al. |
| 7,163,305 B2 | 1/2007 | Bienick |
| 7,165,977 B2 | 1/2007 | Jiang et al. |
| 7,178,941 B2 | 2/2007 | Roberge et al. |
| 7,338,180 B2 | 3/2008 | Wing |
| 7,434,951 B2 | 10/2008 | Bienick |
| 7,744,252 B2 | 6/2010 | Maxik |
| 7,748,806 B2 | 7/2010 | Egan |
| 7,766,502 B2 | 8/2010 | Tress |
| 7,824,055 B2 | 11/2010 | Sherman |
| 7,840,286 B2 | 11/2010 | Caldwell et al. |
| 8,044,415 B2 | 10/2011 | Messere et al. |
| 8,186,844 B2 | 5/2012 | Hall |
| 8,459,817 B2 | 6/2013 | Alberghetti et al. |
| 8,657,392 B2 | 2/2014 | Fabbro et al. |
| 8,742,686 B2 | 6/2014 | Zampini, II et al. |
| 2003/0038571 A1 | 2/2003 | Obrock et al. |
| 2004/0257760 A1 | 12/2004 | Record et al. |
| 2006/0228913 A1 | 10/2006 | Jiang et al. |
| 2007/0139909 A1 | 6/2007 | Wing |
| 2007/0145915 A1 | 6/2007 | Roberge et al. |
| 2008/0043456 A1 | 2/2008 | Bernardini et al. |
| 2008/0121146 A1 | 5/2008 | Burns et al. |
| 2008/0278932 A1 | 11/2008 | Tress |
| 2009/0021927 A1 | 1/2009 | Hall et al. |
| 2011/0121654 A1 | 5/2011 | Recker et al. |
| 2011/0133655 A1 | 6/2011 | Recker et al. |
| 2011/0164399 A1 | 7/2011 | Driver et al. |
| 2011/0273867 A1 | 11/2011 | Horst et al. |
| 2012/0320627 A1 | 12/2012 | Araki et al. |
| 2013/0188338 A1 | 7/2013 | Melhaff |
| 2013/0286651 A1 | 10/2013 | Takeuchi |
| 2014/0139040 A1 | 5/2014 | Fabbro et al. |
| 2014/0376213 A1 | 12/2014 | Miedema et al. |

FOREIGN PATENT DOCUMENTS

| | | |
|---|---|---|
| WO | 2008151720 A1 | 12/2008 |
| WO | 2010133478 A2 | 11/2010 |
| WO | 2013087081 A1 | 6/2013 |
| WO | 2014032190 A1 | 3/2014 |

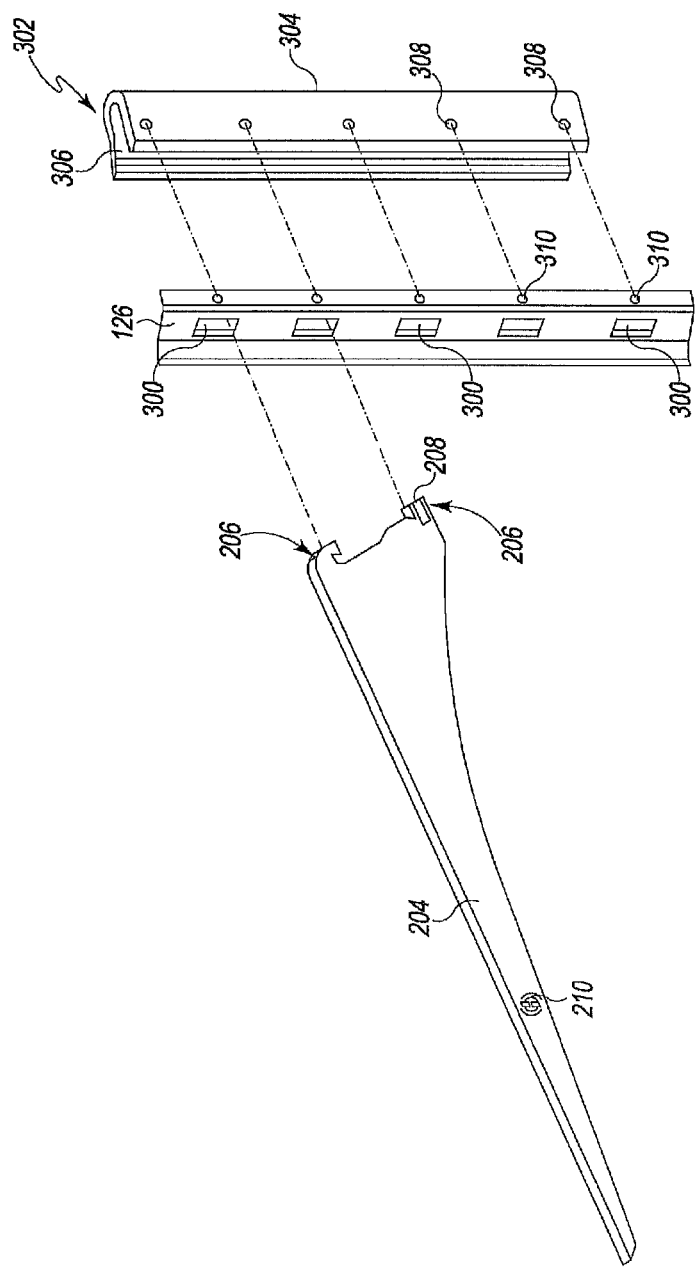

POWER SUPPLIES FOR LIGHTED SHELVES IN A REFRIGERATOR

CROSS-REFERENCE TO RELATED APPLICATIONS

This application is a continuation of patent application Ser. No. 14/880,604, filed Oct. 12, 2015, which is a continuation of patent application Ser. No. 13/761,784, filed Feb. 7, 2013, now U.S. Pat. No. 9,157,678, the disclosures of which are hereby incorporated by reference in their entireties.

FIELD OF THE INVENTION

The present disclosure relates, generally, to refrigerator appliances and, more particularly, to systems and methods for powering lighted shelves in refrigerator appliances.

BACKGROUND OF THE INVENTION

A refrigerator is an appliance used to store food items at preset temperatures. A refrigerator appliance typically includes one or more temperature-controlled compartments into which food items may be placed to preserve the food items for later consumption. A refrigerator appliance also typically includes a plurality of shelves on which the food items may be arranged within the one or more temperature-controlled compartments. In some refrigerator appliances, the plurality of shelves may be adjustable (i.e., the shelves may each be removably mounted in a plurality of shelf mounting positions). Some or all of the plurality of shelves may also carry one or more lighting devices for illuminating food items placed in the one or more temperature-controlled compartments.

SUMMARY OF THE INVENTION

According to one aspect, a refrigerator appliance may comprise a cabinet having a temperature-controlled compartment defined therein, a shelf ladder disposed at least partially in the temperature-controlled compartment and providing a plurality of shelf mounting positions, the shelf ladder comprising an electrical bus including first, second, and third conductors, the second conductor configured to supply power at a first current level when electrically coupled to the first conductor, the third conductor configured to supply power at a second current level when electrically coupled to the first conductor, and a first adjustable shelf carrying a first lighting device, the first adjustable shelf being removably mountable in one of the plurality of shelf mounting positions such that the first lighting device is electrically coupled between the first conductor and the second conductor.

In some embodiments, the refrigerator appliance may further comprise a second adjustable shelf carrying a second lighting device, the second adjustable shelf being removably mountable in one of the plurality of shelf mounting positions such that the second lighting device is electrically coupled between the first conductor and the third conductor. In other embodiments, the first adjustable shelf may further comprise a second lighting device, the second lighting device being electrically coupled between the first conductor and the third conductor when the first adjustable shelf is removably mounted in one of the plurality of shelf mounting positions. The first conductor may be positioned between the second and third conductors and may be spaced apart from both the second and third conductors. The first conductor may be electrically grounded.

In still other embodiments, the first adjustable shelf may comprise a mounting bracket configured to engage the shelf ladder to cantilever the first adjustable shelf in one of the plurality of shelf mounting positions. In such embodiments, the mounting bracket may comprise a first tab configured to electrically couple to the first conductor and to the second conductor when the first adjustable shelf is cantilevered in one of the plurality of shelf mounting positions. The mounting bracket may further comprise a second tab configured to electrically couple to the first conductor and to the third conductor when the first adjustable shelf is cantilevered in one of the plurality of shelf mounting positions. The first and second tabs of the mounting bracket may each be electrically isolated from a body of the mounting bracket that supports the first adjustable shelf.

In some embodiments, at least one of the first and second conductors may be spring-loaded to apply force against the first tab when the first adjustable shelf is cantilevered in one of the plurality of shelf mounting positions. In such embodiments, the first tab may be configured to scrape a portion of the first conductor and a portion of the second conductor as the first adjustable shelf is cantilevered in one of the plurality of shelf mounting positions.

According to another aspect, a refrigerator appliance may comprise a cabinet having a temperature-controlled compartment defined therein, a first shelf ladder disposed at least partially in the temperature-controlled compartment and including a first electrical bus configured to supply power at a first current level, a second shelf ladder disposed at least partially in the temperature-controlled compartment and including a second electrical bus configured to supply power at a second current level, and a first adjustable shelf carrying a first lighting device, the first adjustable shelf being removably mountable on the first and second shelf ladders such that the first lighting device is electrically coupled to the first electrical bus.

In some embodiments, the refrigerator appliance may further comprise a second adjustable shelf carrying a second lighting device, the second adjustable shelf being removably mountable on the first and second shelf ladders such that the second lighting device is electrically coupled to the second electrical bus. In other embodiments, the first adjustable shelf may further comprise a second lighting device, the second lighting device being electrically coupled to the second electrical bus when the first adjustable shelf is removably mounted in one of the plurality of shelf mounting positions.

In still other embodiments, the first adjustable shelf may comprise a first mounting bracket configured to engage the first shelf ladder and a second mounting bracket configured to engage the second shelf ladder to cantilever the first adjustable shelf on the first and second shelf ladders. In such embodiments, the first mounting bracket may comprise a first tab configured to electrically couple to the first electrical bus when the first adjustable shelf is cantilevered on the first and second shelf ladders. The second mounting bracket may comprise a second tab configured to electrically couple to the second electrical bus when the first adjustable shelf is cantilevered on the first and second shelf ladders. The first tab of the first mounting bracket may be electrically isolated from a body of the first mounting bracket that supports the first adjustable shelf.

In some embodiments, the first electrical bus may comprise first and second conductors having a gap therebetween, the gap between the first and second conductors being sized to receive the first tab when the first adjustable shelf is cantilevered on the first and second shelf ladders. At least one of the first and second conductors may be spring-loaded to apply force against the first tab when the first adjustable shelf is cantilevered on the first and second shelf ladders. In such embodiments, the first tab may be configured to scrape a portion of the first conductor and a portion of the second conductor as the first adjustable shelf is cantilevered on the first and second shelf ladders.

BRIEF DESCRIPTION OF THE DRAWINGS

The detailed description particularly refers to the following figures, in which:

FIG. 3 is a partially exploded view of one embodiment of a shelf ladder, an electrical bus, and a mounting bracket of the refrigerator appliance of FIG. 1;

Figure 1:
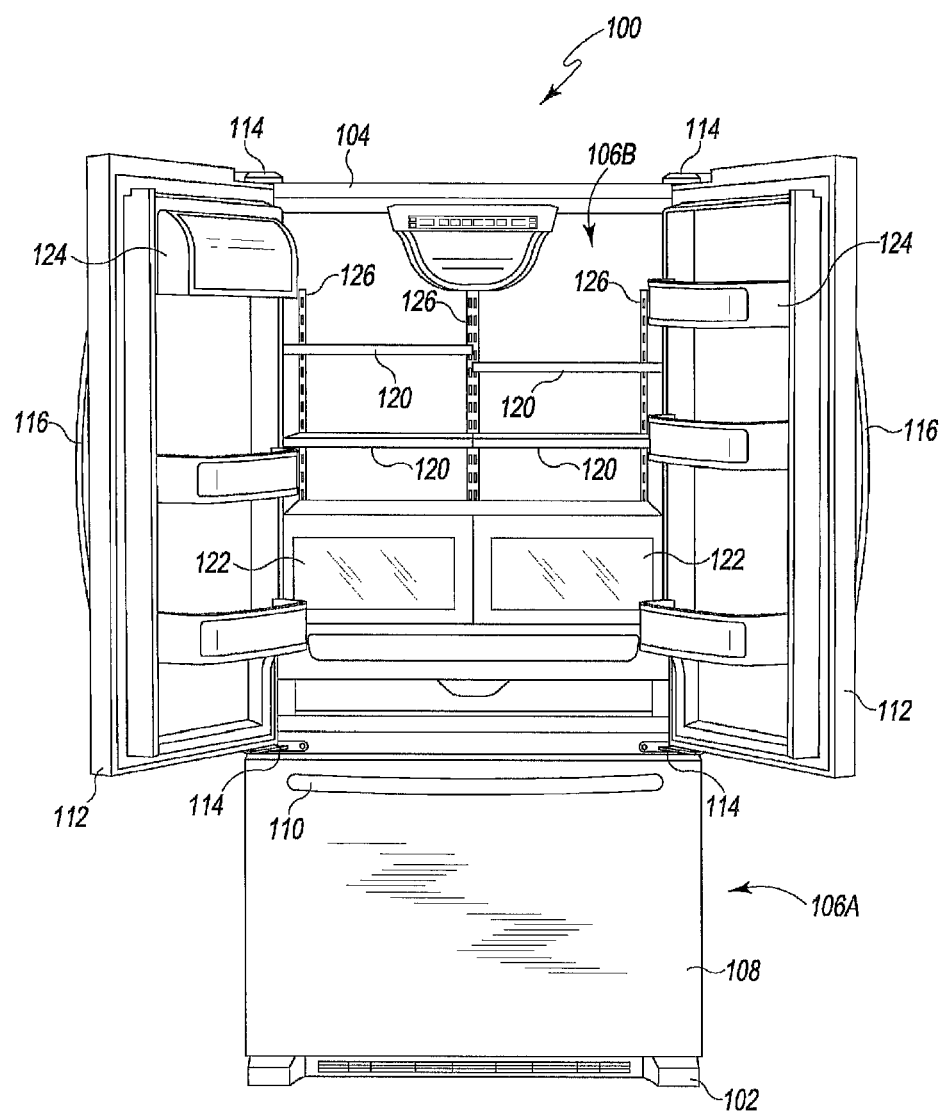
FIG. 1 is a front elevation view of a refrigerator appliance showing a number of adjustable shelves removably mounted in a plurality of shelf mounting positions within a temperature-controlled compartment of the refrigerator appliance.

Where considered appropriate, reference labels have been repeated among the figures to indicate corresponding or analogous elements.

DETAILED DESCRIPTION

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives falling within the spirit and scope of the invention as defined by the appended claims.

Referring to FIG. 1, a home appliance is shown as a refrigerator appliance 100 (hereinafter, the refrigerator 100). One illustrative example of the refrigerator 100 is the Whirlpool Latitude French Door Refrigerator, which is commercially available from Whirlpool Corporation of Benton Harbor, Mich. The refrigerator 100 includes a lower frame 102 and a cabinet 104 extending upwardly from the lower frame 102. The cabinet 104 of the refrigerator 100 includes a pair of temperature-controlled compartments 106 that are independently operable to maintain food items stored therein at one or more set temperatures.

The lower temperature-controlled compartment 106 is a freezer compartment 106A, and the refrigerator 100 includes a drawer 108 that is positioned in the freezer compartment 106A. The drawer 108 is moveable relative to the cabinet 104 such that food items may be placed in the drawer 108 for storage in the freezer compartment 106A and retrieved from the drawer 108 when read for use. A handle 110 is located on the drawer 108 so that a user may open and close the drawer 108.

The upper temperature-controlled compartment 106 is a refrigerated compartment 106B into which a user may place and store food items such as milk, cheese, produce, etcetera. A pair of doors 112 are each hinged to the front of the cabinet 104 via a pair of hinge assemblies 114. The doors 112 permit user access to the refrigerated compartment 106B such that food items may be placed in and retrieved from the refrigerated compartment 106B. A handle 116 is located on each of the doors 112 so that a user may open and close the doors 112.

While the illustrative embodiment of the refrigerator 100 shown in FIG. 1 is a "french-door" model with a pair of doors 112 operable to permit access to the refrigerated compartment 106B, it should be appreciated that other configurations are contemplated, such as, for example, configurations having only one door 112 operable to permit access to the refrigerated compartment 106B. Additionally, it should also be appreciated that, in some embodiments, the freezer compartment 106A may be positioned above the refrigerated compartment 106B and, in other embodiments, either one of the temperature-controlled compartments 106 may be omitted. It should be further appreciated that, in some embodiments, the refrigerator 100 may include more than one freezer compartment 106A and/or more than one refrigerated compartment 106B. Configurations of the refrigerator 100 are also contemplated in which the freezer compartment 106.A is located on one side of the cabinet 104 and the refrigerated compartment 106B is located on the opposite side of the cabinet 104.

As shown in FIG. 1, the refrigerator 100 also includes four adjustable shelves 120 removably mounted within the refrigerated compartment 106B, upon which a user of the refrigerator 100 may arrange food items. It is contemplated that the refrigerator 100 may include any number of adjustable shelves 120 within the temperature-controlled compartments 106. As the adjustable shelves 120 are removably mounted within the refrigerated compartment 106B, a user may remove any adjustable shelf 120 and relocate it to any available shelf mounting position within the refrigerated compartment 106B. It will be appreciated that the refrigerator 100 ma additionally or alternatively include other devices for supporting or storing food within the temperature-controlled compartments 106, such as, for example, drawers 122 or door bins 124 (as shown in FIG. 1). As used in the present disclosure, the term "shelf" is to be considered in its broadest sense as any device that will hold a food item, including shelves, drawers, bins, panels, racks, and the like.

The adjustable shelves 120 may be removably mounted within the refrigerated compartment 106B using any suitable mechanism. In the illustrative embodiment of the refrigerator 100 shown in FIG. 1, three shelf ladders 126 are disposed within the refrigerated compartment 106B to provide a plurality of shelf mounting positions for the adjustable shelves 120. It is contemplated that any number of shelf ladders 126 may be used for removably mounting the adjustable shelves 120. In some embodiments, the shelf ladders 126 may be secured to one or more walls of the refrigerator compartment 106B using screws, bolts, rivets, adhesive, or other fixation mechanisms. In other embodiments, the shelf ladders 126 may be integrally formed into one or more walls of the refrigerator compartment 106B. It should also be appreciated that the adjustable shelves 120 may be removably mounted within the refrigerated compartment 106B using any number of mechanisms other than the shelf ladders 126. By way of example, the adjustable shelves 120 may be removably mounted within the refrigerated compartment 106B using ledges, tracks, slides, glides, rollers, and the like.

Figure 2A:
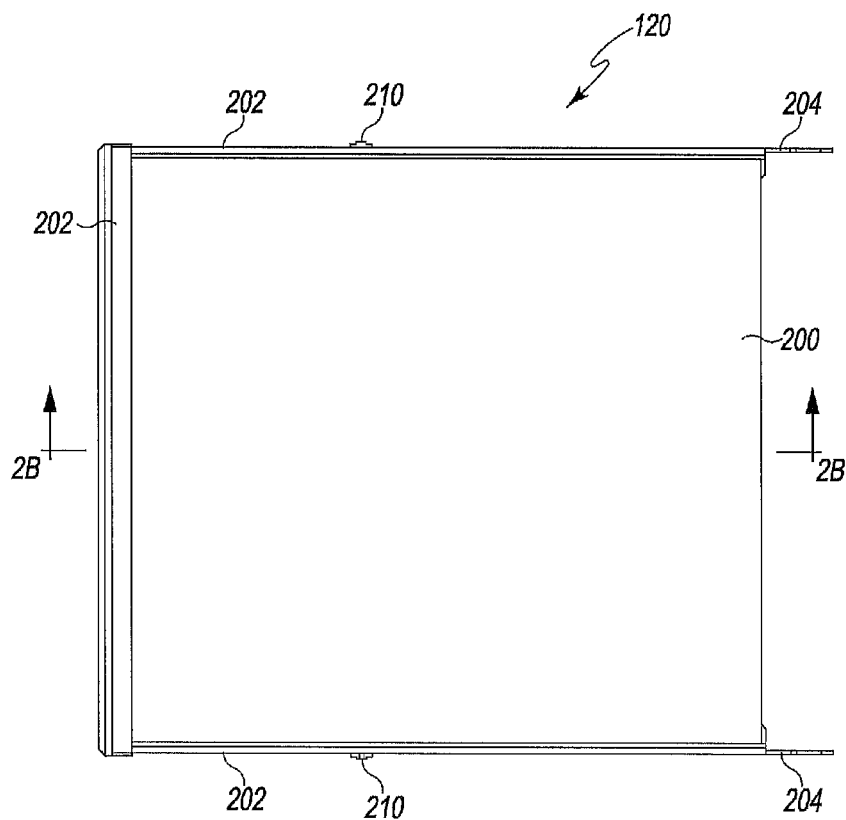
FIG. 2A is top plan view of one embodiment of an adjustable shelf that is removably mountable in the refrigerator appliance of FIG. 1.
Figure 2B:
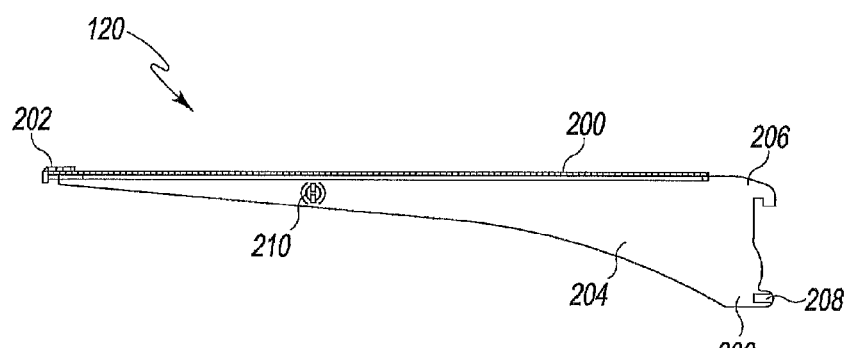
FIG. 2B is a cross-sectional view of the adjustable shelf of FIG. 2A, taken along the line 2B 2B in FIG. 2A.

One illustrative embodiment of an adjustable shelf 120 that is removably mountable within the refrigerated compartment 106B is Shown in FIGS. 2A and 2B. The adjustable shelf 120 includes a support surface 200 upon which a user of the refrigerator 100 may arrange food items. The support surface 200 may illustratively be formed of glass, plastic, or any other suitable material. As shown in FIGS. 2A and 2B, the support surface 200 is illustratively bounded on three sides by lips 202, which assist in retaining food items arranged on the support surface 200 of the adjustable shelf 120.

In the illustrative embodiment, the adjustable shelf 120 includes a pair of mounting brackets 204 that are spaced apart from one another the same distance as a pair of the shelf ladders 126 of the refrigerator 100. As described further below (with reference to FIG. 3), these mounting brackets 204 allow the adjustable shelf 120 to be removably mounted on a pair of the shelf ladders 126. As illustrated in FIG. 2B, each of the mounting brackets 204 of the adjustable shelf 120 may include a body and a number of tabs 206 configured to engage a number of slots of one of the shelf ladders 126. In some embodiments, the mounting bracket 204 may include multiple upper tabs 206 and/or multiple lower tabs 206 extending from the body of the mounting bracket 204. Any of the tabs 206 of the mounting bracket 204 may include a conductor 208 disposed on or integrated into the tab 206. Where one of the tabs 206 includes a conductor 208, the tab 206 may be electrically isolated from the body of the mounting bracket 204 (particularly, where the mounting bracket 204 is formed of a conductive material, such as steel).

Some or all of the adjustable shelves 120 may carry one or more lighting devices 210 for illuminating food items placed in the refrigerated compartment 106B. For instance, each of the adjustable shelves 120 may carry one or more light emitting diodes (LEDs) 210. It is contemplated that, in some embodiments, some of the adjustable shelves 120 of the refrigerator 100 may not carry a lighting device (i.e., the refrigerator 100 may include both lighted and non-lighted adjustable shelves 120. Each lighting device 210 carried by an adjustable shelf 120 may be electrically coupled to a conductor 208 disposed on or integrated into one of the tabs 206 of a mounting bracket 204 of the adjustable shelf 120. As described further below, the conductor 208 may be electrically coupled to an electrical bus in one of the shelf ladders 126 when the adjustable shelf is removably mounted in the refrigerated compartment 106B. As such, the corresponding lighting device 210 will also be electrically coupled to the electrical bus in the shelf ladder 126 when the adjustable shelf is removably mounted, in the refrigerated compartment 106B.

As shown in more detail in FIG. 3, each of the shelf ladders 126 in the illustrative embodiment of refrigerator 100 has a number of slots 300 defined therein. As described above, each of the adjustable shelves 120 may illustratively include a pair of mounting brackets 204 that are spaced apart from one another the same distance as a pair of the shelf ladders 126 (one such mounting bracket 204 being shown in FIG. 3). The mounting brackets 204 of an adjustable shelf 120 may each engage one or more slots 300 defined in one of the shelf ladders 126 to cantilever the adjustable shelf 120 to a pair of shelf ladders 126. As such, the slots 300 defined in the shelf ladders 126 provide a plurality of shelf mounting positions for the adjustable shelves 120. In the illustrative embodiment, the slots 300 defined in the shelf ladders 126 (and, hence, the shelf mounting positions) are spaced approximately one inch apart. It will be appreciated that other configurations for the spacing of the slots 300 and the shelf mounting positions are possible.

In the illustrative embodiment of the refrigerator 100, one or more of the shelf ladders 126 may include an electrical bus 302 positioned within (or behind) each slot 300 defined in the shelf ladder(s) 126, as illustrated in FIG. 3. It will be appreciated that, where each adjustable shelf 120 engages two or more shelf ladders 126, only some of the shelf ladders 126 may include an electrical bus 302. The electrical bus 302 includes an insulating housing 304 that supports at least one electrical conductor 306. In some embodiments, the insulating housing 304 may include a number of protrusions 308 that snap into corresponding holes 310 on the shelf ladder 126 to secure the electrical bus 302 behind the shelf ladder 126. In other embodiments, an electrical bus 302 may be secured to one of the shelf ladders 126 using screws, bolts, rivets, adhesive, or other fixation mechanisms.

As described above (with reference to FIG. 2B), a mounting bracket 204 of an adjustable shelf 120 may include a number of tabs 206 configured to engage a number of slots 300 of one of the shelf ladders 126. In the illustrative embodiment of FIG. 3, an upper tab 206 may have a hook shape that rests on a lower edge of one of the slots 300 when the adjustable shelf 120 is removably mounted in one of the shelf mounting positions. The mounting bracket 204 may also have a lower tab 206 that extends through an adjacent slot 300 of the shelf ladder 126. As noted above, the mounting bracket 204 may include multiple upper tabs 206 and/or multiple lower tabs 206 extending from the body of the mounting bracket 204, any of which may include one or more conductors 208. When one of the tabs 206 extends through a slot 300 defined in the shelf ladder 126 (when the adjustable shelf 120 is removably mounted in one of the shelf mounting positions), a conductor 208 carried by the tab 206 may contact the at least one conductor 306 of the electrical bus 302 behind the slot 300 to provide power to any lighting devices 210 carried by the adjustable shelf 120. It is contemplated that each mounting bracket 204 (and each tab 206 thereof) may carry any number of conductors 208 for interfacing with any number of conductors 306 included in the electrical bus 302.

Figure 4A:
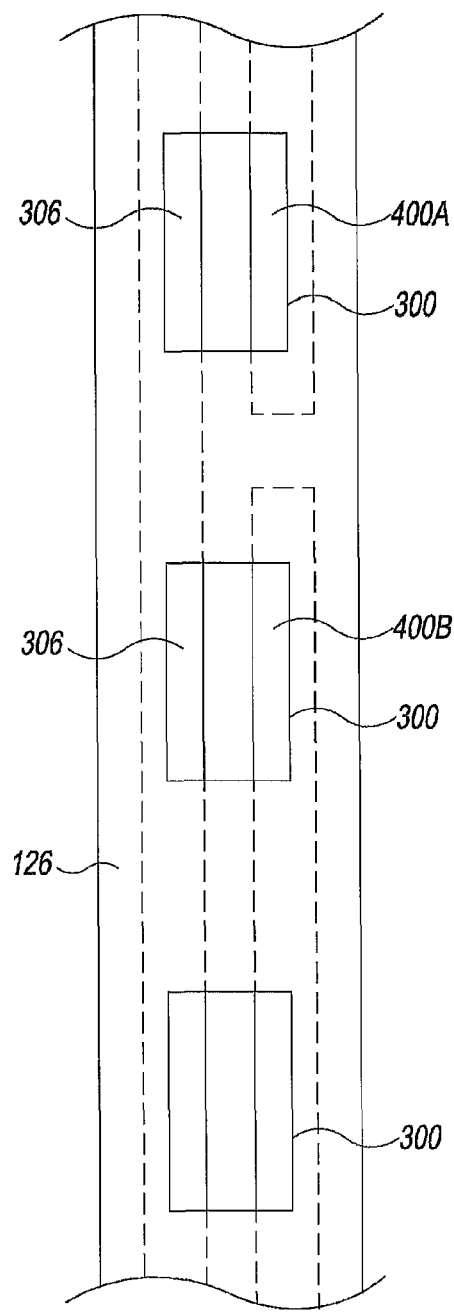
FIG. 4A is a front elevation view of the shelf ladder and the electrical bus of FIG. 3.
Figure 4B:
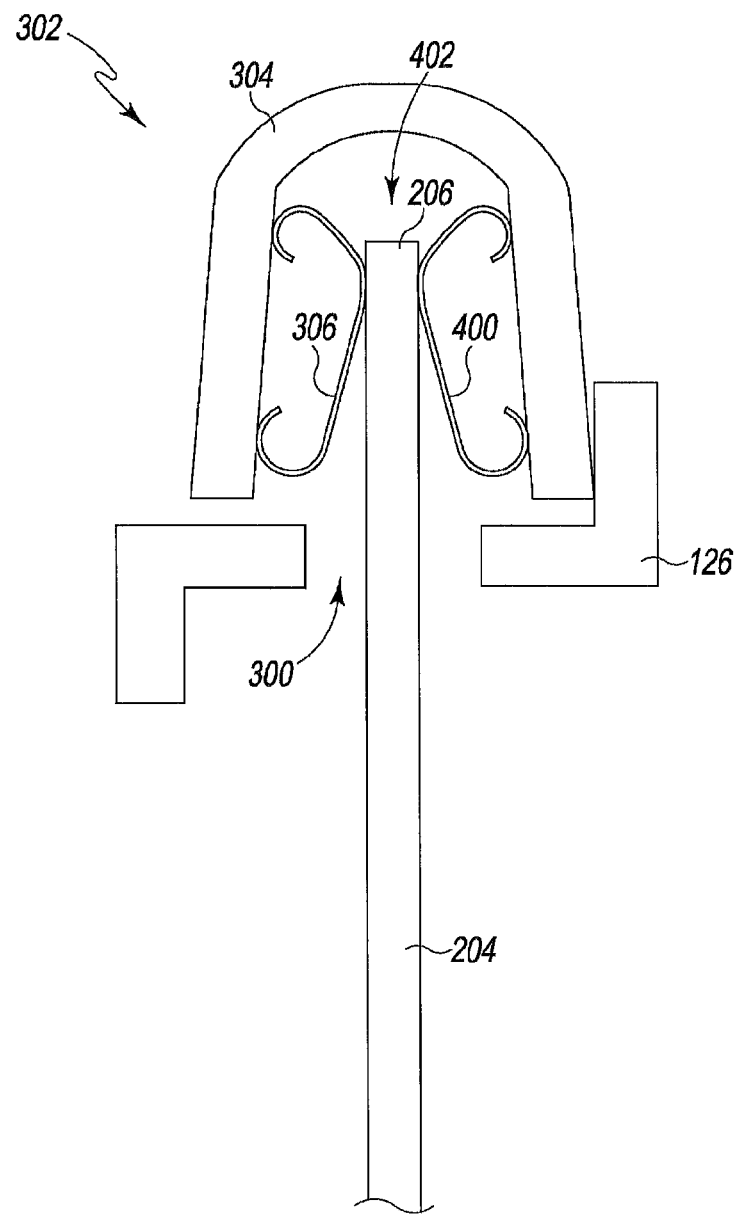
FIG. 4B is a top cross-sectional view of one embodiment of a mounting bracket engaging the shelf ladder and the electrical bus of FIG. 4A.

As shown in the illustrative embodiment of FIGS. 4A and 4B, the electrical bus 302 may include two conductors 306, 400 supported behind the shelf ladder 126. Both of the conductors 306, 400 are accessible through one or more of the slots 300 of the shelf ladder 126, but are otherwise shielded by a face of the shelf ladder 126. As illustrated by the conductor 306 in FIG. 4A, some or all of the conductors of the electrical bus 302 may be continuous and may be exposed in each slot 300 of the shelf ladder 126. Additionally or alternatively, as illustrated by the conductor 400 in FIG. 4A, some or all of the conductors of the electrical bus 302 may be separated into discrete sections 400A, 400B that are each exposed in only some slots 300 of the shelf ladder 126. These discrete sections 400A, 400B of the conductor 400 may each form independent electrical circuits with the continuous conductor 306. In the illustrative embodiment of FIGS. 4A and 4B, the continuous conductor 306 is electrically grounded.

The engagement of a mounting bracket 204 of an adjustable shelf 120 with the shelf ladder 126 and the electrical bus 302 of FIG. 4A is illustratively shown in cross-section in FIG. 4B. The conductors 306, 400 of the electrical bus 302 are each disposed on one side of the housing 304 and are spaced apart by a gap 402. The gap 402 may be sized to prevent degenerate growth between the conductors 306, 400. One or both of the conductors 306, 400 may be spring-loaded to narrow (but not close) the gap 402 between the conductors 306, 400. In the illustrative embodiment of FIG. 4B, the conductors 306, 400 are each comprised of a deformable metal that may be bent out of shape by sufficient force, but that returns to its original shape in the absence of such force. It is also contemplated that, in other embodiments, the conductors 306, 400 may be spring-loaded by other mechanisms (e.g., non-deformable conductors 306, 400 that are coupled to the housing 304 by traditional springs).

Where the conductors 306, 400 are spring-loaded, the conductors 306, 400 will apply force against a tab 206 of the mounting bracket 204 that is received in the slot 300 of the shelf ladder 126. This force between the conductors 306, 400 and the tab 206 may help to ensure a good electrical connection between the conductors 306, 400 and a conductor 208 carried by the tab 206. Furthermore, where the conductors 306, 400 are spring-loaded, the tab 206 may scrape portions of the conductors 306, 400 as the tab 206 enters the electrical bus 302 and pushes against the conductors 306, 400. This scraping may remove surface grime from the conductors 306, 400 and further help to ensure a good electrical connection between the conductors 306, 400 and a conductor 208 carried by the tab 206.

Figure 5A:
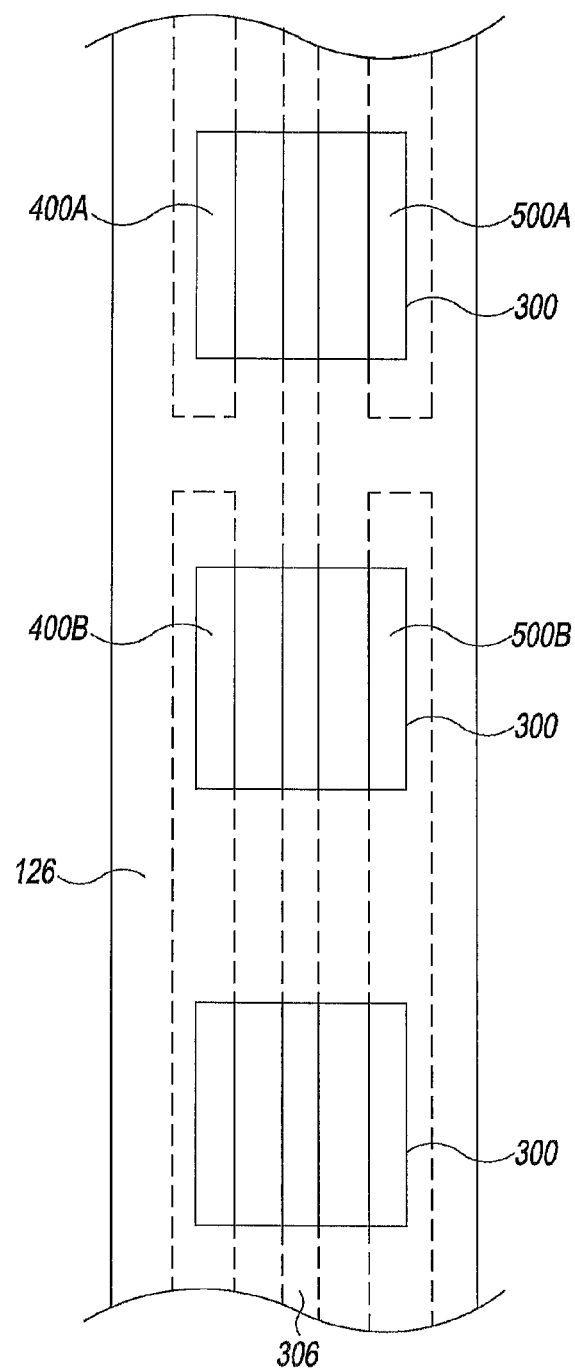
FIG. 5A is a front elevation view of another embodiment of a shelf ladder and an electrical bus of the refrigerator appliance of FIG. 1.
Figure 5B:
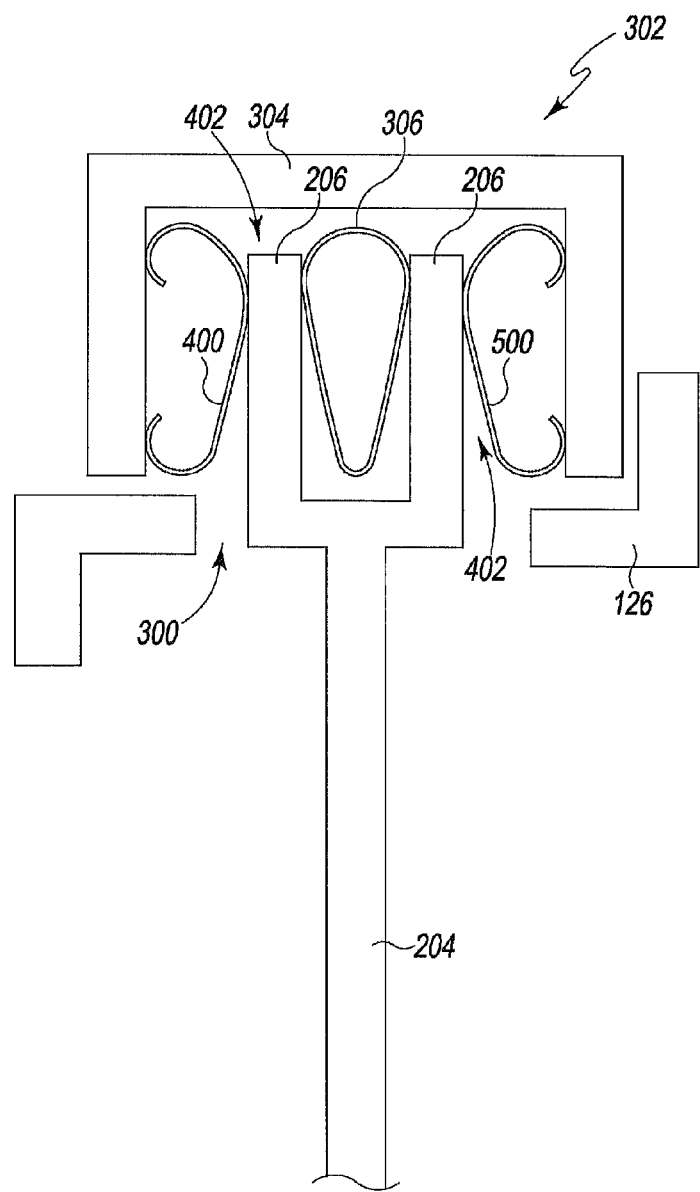
FIG. 5B is a top cross-sectional view of one embodiment of a mounting bracket engaging the shelf ladder and the electrical bus of FIG. 5A.

As described above, in one illustrative embodiment of the refrigerator 100, each adjustable shelf 120 includes two mounting brackets 204 that each engage one of the shelf ladders 126. In embodiments where each shelf ladder 126 includes an associated electrical bus 302, one or more lighting devices 210 carried by each adjustable shelf 120 may electrically couple to one or both electrical buses 302. The lighting devices 210 may electrically couple to the electrical buses 302 via one or more conductors 208 carried by one or more tabs 206 of one or both mounting brackets 204. For instance, one adjustable shelf 120 may electrically couple its lighting device 210 to the electrical bus 302 of a first shelf ladder 126, while another adjustable shelf 120 may electrically couple its lighting device 210 to the electrical bus 302 of a second shelf ladder 126 (both adjustable shelves 120 being cantilevered on the first and second shelf ladders 126). Additionally or alternatively, art adjustable shelf 120 may electrically couple a first lighting device 210 to the electrical bus 302 of a first shelf ladder 126, while electrically coupling a second lighting device 210 carried by the same adjustable shelf 120 to the electrical bus 302 of a second shelf ladder 126.

Where each adjustable shelf 120 is removably mountable on two shelf ladders 126, each including a corresponding electrical bus 302, these two electrical buses 302 may supply power at different current levels. For instance, one electrical bus may supply power at a current level of 100 milliamps, while the other electrical bus 302 supplies power at a lower current level, such as, for example, 30 or 50 milliamps. Where two electrical buses 302 are available to supply power to each adjustable shelf 120 at different current levels (e.g., 30, 50, or 100 milliamps), the adjustable shelves 120 may carry different types of LEDs 210. For instance, sonic adjustable shelves 120 may carry white LEDs 210, other adjustable shelves 120 may carry color LEDs 210, and still other adjustable shelves 120 may carry both white and color LEDs 210. Each adjustable shelf 120 may then electrically couple each of the LEDs 210 to the appropriate electrical bus 302 to receive power at the appropriate current level for that LED 210, As shown in FIGS. 5A and 5B, another illustrative embodiment of the electrical bus 302 may include three conductors 306, 400, 500 supported behind the shelf ladder 126. Each of the conductors 305, 400, 500 is accessible through one or more of the slots 300 of the shelf ladder 126, but is otherwise shielded by a face of the shelf ladder 126. As illustrated by the conductor 306 in FIG. 5A, some or all of the conductors of the electrical bus 302 may be continuous and may be exposed in each slot 300 of the shelf ladder 126. Additionally or alternatively, as illustrated by the conductors 400, 500 in FIG. 5A, some or all of the conductors of the electrical bus 302 may be separated into discrete sections 400A, 400B, 500A, 500B that are each exposed in only some slots 300 of the shelf ladder 126. These discrete sections 400A, 400B, 500A, 500B of the conductors 400, 500 may each form independent electrical circuits with the continuous conductor 306. In the illustrative embodiment of FIGS. 5A and 5B, the continuous conductor 306 is electrically grounded.

The engagement of a mounting bracket 204 of an adjustable shelf 120 with the shelf ladder 126 and the electrical bus 302 of FIG. 5A is illustratively shown in cross-section in FIG. 5B. The conductors 400, 500 of the electrical bus 302 are each disposed on one side of the housing 304. The conductor $06 is disposed between the conductors 400, 500 and is spaced apart from each conductor 400, 500 by a respective gap 402. The respective gaps 402 may be sized to prevent degenerate growth between the conductors 306, 400, 500. One or more of the conductors 306, 400, 500 may be spring-loaded to narrow (but not close) the gaps 402 between the conductors 306, 400, 500. In the illustrative embodiment of FIG. 5B, the conductors 306, 400, 500 are each comprised of a deformable metal that may be bent out of shape by sufficient force, but that returns to its original shape in the absence of such force. It is also contemplated that, in other embodiments, the conductors 306, 400, 500 may be spring-loaded b other mechanisms (e.g., non-deformable conductors 400, 500 that are coupled to the housing 304 by traditional springs Where the conductors 306, 400, 500 are spring-loaded, the conductors 306, 400, 500 will apply force against the tabs 206 of the mounting bracket 204 that are received in the slot 300 of the shelf ladder 126. This force between the conductors 306, 400, 500 and the tabs 206 may help to ensure a good electrical connection between the conductors 306, 400, 500 and one or more conductors 208 carried by the tabs 206. Furthermore, where the conductors 306, 400, 500 are spring-loaded, the tabs 206 may scrape portions of the conductors 306, 400, 500 as the tabs 206 enter the electrical bus 302 and push against the conductors 306, 400, 500. This scraping may remove surface grime from the conductors 306, 400, 500 and further help to ensure a good electrical connection between the conductors 306, 400, 500 and one or more conductors 208 carried by the tabs 206.

In an illustrative embodiment of the refrigerator 100 employing the shelf ladder 126 and electrical bus 302 of FIGS. 5A and 5B, one or more lighting devices 210 carried by each adjustable shelf 120 may electrically couple to either the conductors 306, 400 or the conductors 306, 500. The lighting devices 210 may electrically couple to either pair of conductors of the electrical bus 302 via one or more conductors 208 carried by one or more tabs 206 of a mounting bracket 204 of the adjustable shelf 120. For instance, one adjustable shelf 120 may electrically couple its lighting device 210 to the conductors 306, 400 of the electrical bus 302, while another adjustable shelf 120 may electrically couple its lighting device 210 to the conductors 306, 500 of the electrical bus 302. Additionally or alternatively, an adjustable shelf 120 may electrically couple a first lighting device 210 to the conductors 306, 400 of the electrical bus 302, while electrically coupling a second lighting device 210 carried by the same adjustable shelf 120 to the conductors 306, 500 of the electrical bus 302.

In embodiments employing the electrical bus 302 of FIGS. 5A and 5B, the conductors 400, 500 may supply power at different current levels when electrically coupled to the conductor 306. For instance, the conductor 400 may supply power at a current level of 100 milliamps, while the conductor 500 may supply power at a lower current level, such as for example, 30 or 50 milliamps. Where different pairs of the conductors 306, 400, 500 are available to supply power to each adjustable shelf 120 at different current levels (e.g., 30, 50, or 100 milliamps), the adjustable shelves 120 may carry different types of LEDs 210. For instance, some adjustable shelves 120 may carry white LEDs 210, other adjustable shelves 120 may carry color LEDs 210, and still other adjustable shelves 120 may carry both white and color LEDs 210. Each adjustable shelf 120 may then electrically couple each of the LEDs 210 to the appropriate pair of the conductors 306, 400, 500 of the electrical bus 302 to receive power at the appropriate current level for that LED 210.

There are a plurality of advantages of the present disclosure arising from the various features of the systems, apparatus, and methods described herein. It will be noted that alternative embodiments of the systems, apparatus, and methods of the present disclosure may not include all of the features described yet still benefit from at least some of the advantages of such features. Those of ordinary skill in the art may readily devise their own implementations of the systems, apparatus, and methods that incorporate one or more of the features of the present disclosure and fall within the spirit and scope of the present invention as defined by the appended claims.

What is claimed is:

1. A refrigerator appliance comprising: a cabinet having a temperature-controlled compartment defined therein;
a first shelf ladder disposed at least partially in the temperature-controlled compartment providing at least a first and second shelf mounting position, the first shelf mounting position has a first slot and the second shelf mounting position has a second slot separated and spaced apart from the first slot, the first shelf ladder comprising a first bus conductor, said first bus conductor being electrically grounded, a second bus conductor, and a third bus conductor, the second and third bus conductors each having a first section spaced apart from a second section;
a first adjustable shelf carrying a first lighting device, the first adjustable shelf having a mounting bracket with tabs configured to be removably mountable in one of the first slot and the second slot such that the first lighting device is electrically coupled to the electrical bus when the first adjustable shelf is removably mounted in one of the plurality of shelf mounting positions;
a second adjustable shelf carrying a second lighting device, the second adjustable shelf being removably mountable in one of the plurality of shelf mounting positions such that the second lighting device is electrically coupled to the electrical bus when the second adjustable shelf is removably mounted in one of a plurality of shelf mounting positions;
wherein the second bus conductor and third bus conductor are separated into a first section and a second section such that the first section is exposed in the first slot and forms a first independent circuit with the electrically grounded conductor when the adjustable shelf is removably mounted in the first slot and the second section is exposed in the second slot and forms a second independent circuit with the electrically grounded conductor when the adjustable shelf is removably mounted in the second slot.

2. The refrigerator appliance of claim 1, wherein the electrically grounded conductor and the second bus conductor are exposed in the first slot to form a circuit with the first lighting device when the first adjustable shelf is removably mounted in the first slot.

3. The refrigerator appliance of claim 1, wherein the electrically grounded conductor and the third bus conductor are exposed in the second slot to form a circuit with the first lighting device when the first adjustable shelf is removably mounted in the second slot.

4. The refrigerator appliance of claim 1 wherein at least one of the second bus conductor and third bus conductor is separated into a first section and a second section such that the first section is exposed in the first slot and forms a first independent circuit with the electrically grounded conductor when the adjustable shelf is removably mounted in the first slot and the second section is exposed in the second slot and forms a second independent circuit with the electrically grounded conductor when the adjustable shelf is removably mounted in the second slot.

5. The refrigerator appliance of claim 1 wherein the electrically grounded conductor extends along the shelf ladder between the first slot and the second slot and is exposed in the first slot and the second slot.

6. The refrigerator appliance of claim 1, further comprising an insulating housing at least partially surrounding the electrical bus.

7. The refrigerator appliance of claim 1 wherein the mounting bracket is configured to engage the first shelf ladder to cantilever the first adjustable shelf in one of the plurality of mounting positions.

8. The refrigerator appliance of claim 7 whereby the mounting bracket comprises a first tab configured to electrically couple to the first bus conductor and a second tab configured to couple to the second bus conductor when the first adjustable shelf is cantilevered in one of the plurality of shelf mounting positions.

9. The refrigerator appliance of claim 8 further providing that the first and second tabs of the mounting bracket are each electrically isolated from a body of the mounting bracket that supports the first adjustable shelf.

10. The refrigerator appliance of claim 8, wherein at least one of the first and second bus conductors is spring-loaded to apply force against the first tab when the first adjustable shelf is cantilevered in one of the plurality of shelf mounting positions.

11. The refrigerator appliance of claim 10, wherein the first tab is configured to scrape a portion of the first conductor and a portion of the second conductor as the first adjustable shelf is cantilevered in one of the plurality of shelf mounting positions.

* * * * *